(12) United States Patent
Parks

(10) Patent No.: US 7,506,837 B2
(45) Date of Patent: Mar. 24, 2009

(54) INBOUND TRANSITION CONTROL FOR A TAIL-SITTING VERTICAL TAKE OFF AND LANDING AIRCRAFT

(75) Inventor: Robert Parks, San Jose, CA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 20 days.

(21) Appl. No.: 11/228,229

(22) Filed: Sep. 19, 2005

(65) Prior Publication Data

US 2007/0069065 A1 Mar. 29, 2007

Related U.S. Application Data

(60) Provisional application No. 60/610,568, filed on Sep. 17, 2004.

(51) Int. Cl.
B64C 27/22 (2006.01)
(52) U.S. Cl. .................................................. 244/7 B
(58) Field of Classification Search ............... 244/12.4, 244/203, 7 B, 45 R, 48
See application file for complete search history.

(56) References Cited

U.S. PATENT DOCUMENTS

| | | | |
|---|---|---|---|
| 1,918,426 A | | 7/1933 | Radnor |
| 2,058,678 A | * | 10/1936 | Fry .......................... 244/17.17 |
| 2,328,786 A | * | 9/1943 | Crowder ...................... 244/7 B |
| 2,338,751 A | | 1/1944 | Zuck |
| 2,347,230 A | | 4/1944 | Zuck |
| 2,397,632 A | * | 4/1946 | Stuart .......................... 244/7 B |
| 2,410,967 A | | 11/1946 | Eaton |
| 2,417,725 A | | 3/1947 | Zuck |
| 2,444,781 A | * | 7/1948 | Leonard ..................... 244/7 B |
| D153,331 S | | 4/1949 | Zuck |
| D154,829 S | | 4/1949 | Zuck |
| 2,477,637 A | | 8/1949 | Pierre |
| 2,479,125 A | * | 8/1949 | Leonard ..................... 244/7 B |
| 2,622,826 A | * | 12/1952 | Prince ......................... 244/7 B |
| 2,712,420 A | * | 7/1955 | Amster et al. ............... 244/7 B |

(Continued)

OTHER PUBLICATIONS http://en.wikipedia.org/wiki/Attitude_indicator (available on the web Jul. 30, 2004).*

(Continued)

*Primary Examiner*—Timothy D. Collins
(74) *Attorney, Agent, or Firm*—Katten Muchin Rosenmann LLP; Mark W. Hrozenchik; Richard P. Bauer

(57) ABSTRACT

A system for controlling inbound transition of an aircraft includes a fuselage and first and second freewings pivotably mounted on opposing sides thereof. The system includes an airspeed sensor that outputs an airspeed indication signal. The system includes a controller for increasing aircraft engine thrust to substantially maximum for inbound transition, and for generating pitch and freewing control signals. The system includes actuators for actuating aircraft control surfaces in response to the pitch control signal to rapidly increase pitch of the fuselage to decelerate the aircraft, and for actuating freewing control surfaces in response to the freewing control signal to adjust lift produced by the freewings to oppose climbing of the aircraft due to the increase in engine thrust and the increase in the fuselage pitch. The controller is configured to decrease the engine thrust as the aircraft decelerates until the aircraft is in a hover mode.

27 Claims, 3 Drawing Sheets

U.S. PATENT DOCUMENTS

| | | | |
|---|---|---|---|
| 2,848,180 A | | 8/1958 | Ploger |
| 2,866,608 A | * | 12/1958 | Leonard ............... 244/7 B |
| 2,908,472 A | | 10/1959 | McDonald |
| 2,959,373 A | | 11/1960 | Zuck |
| 2,994,493 A | | 8/1961 | Hartman |
| 3,056,564 A | | 10/1962 | Zuck |
| 3,096,952 A | * | 7/1963 | Roppel ............... 244/12.4 |
| 3,100,377 A | | 8/1963 | Kosin et al. |
| 3,138,351 A | | 6/1964 | Zuck |
| 3,142,455 A | * | 7/1964 | Wilford ............... 244/7 B |
| 3,164,222 A | | 1/1965 | Conrad |
| 3,166,271 A | | 1/1965 | Zuck |
| 3,169,728 A | | 2/1965 | Langfelder et al. |
| 3,175,789 A | | 3/1965 | Blumrich |
| 3,179,353 A | | 4/1965 | Peterson |
| 3,258,206 A | | 6/1966 | Simonson |
| 3,350,035 A | * | 10/1967 | Schlieben ............... 244/7 R |
| 3,387,805 A | | 6/1968 | Barnett et al. |
| 3,415,469 A | | 12/1968 | Spratt |
| 3,475,913 A | | 11/1969 | Mortlock et al. |
| 3,511,455 A | | 5/1970 | Weick |
| 3,563,496 A | | 2/1971 | Zuck |
| 3,664,463 A | | 5/1972 | Kuethe |
| 3,730,459 A | | 5/1973 | Zuck |
| 3,806,068 A | | 4/1974 | Blythe et al. |
| 3,987,981 A | | 10/1976 | Kook |
| 4,005,835 A | | 2/1977 | Gerstine et al. |
| 4,037,405 A | | 7/1977 | Huenniger et al. |
| 4,045,948 A | | 9/1977 | Hannibal |
| 4,071,207 A | | 1/1978 | Piasecki et al. |
| 4,092,716 A | | 5/1978 | Berg et al. |
| 4,124,180 A | | 11/1978 | Wolowicz |
| 4,155,221 A | | 5/1979 | Dhoore et al. |
| 4,175,385 A | | 11/1979 | Nash |
| 4,214,703 A | | 7/1980 | Sorensen et al. |
| 4,241,876 A | | 12/1980 | Pedersen |
| 4,250,658 A | | 2/1981 | Kress |
| 4,358,074 A | | 11/1982 | Schoen et al. |
| 4,415,132 A | | 11/1983 | Shirk |
| 4,474,534 A | | 10/1984 | Thode |
| 4,519,559 A | | 5/1985 | Logan et al. |
| 4,568,043 A | | 2/1986 | Schmittle |
| 4,575,006 A | | 3/1986 | Madden |
| 4,596,368 A | | 6/1986 | Schmittle |
| 4,630,788 A | | 12/1986 | Veaux et al. |
| 4,634,081 A | | 1/1987 | Chee |
| 4,709,879 A | | 12/1987 | Stafford |
| 4,804,155 A | | 2/1989 | Strumbos |
| 4,821,980 A | | 4/1989 | Clausen et al. |
| 4,875,655 A | | 10/1989 | Bender et al. |
| 4,928,907 A | | 5/1990 | Zuck |
| 4,948,072 A | | 8/1990 | Garland et al. |
| 4,964,599 A | | 10/1990 | Farineau |
| 4,967,984 A | | 11/1990 | Allen |
| 4,978,071 A | | 12/1990 | MacLean et al. |
| 5,000,404 A | * | 3/1991 | Martorella ............... 244/188 |
| 5,028,001 A | | 7/1991 | Bender et al. |
| 5,056,738 A | | 10/1991 | Mercer et al. |
| 5,062,587 A | | 11/1991 | Wernicke |
| 5,067,668 A | | 11/1991 | Zuck |
| 5,086,993 A | * | 2/1992 | Wainfan ............... 244/48 |
| 5,115,996 A | | 5/1992 | Moller |
| 5,116,030 A | | 5/1992 | Nowak et al. |
| 5,176,339 A | | 1/1993 | Schmidt |
| 5,280,863 A | | 1/1994 | Schmittle |
| 5,282,358 A | | 2/1994 | Schilling |
| 5,289,994 A | * | 3/1994 | Del Campo Aguilera .... 244/7 B |
| 5,294,077 A | | 3/1994 | Derrien |
| 5,295,643 A | | 3/1994 | Ebbert et al. |
| 5,340,057 A | | 8/1994 | Schmittle |
| 5,366,180 A | | 11/1994 | Wainfan et al. |
| 5,366,181 A | | 11/1994 | Hansen |
| 5,390,877 A | | 2/1995 | Nightingale |
| 5,395,073 A | | 3/1995 | Rutan et al. |
| 5,509,623 A | | 4/1996 | Schmittle |
| 5,516,060 A | * | 5/1996 | McDonnell ............... 244/7 B |
| 5,524,847 A | | 6/1996 | Brodell et al. |
| 5,560,568 A | * | 10/1996 | Schmittle ............... 244/48 |
| 5,666,803 A | | 9/1997 | Windisch |
| 5,687,948 A | | 11/1997 | Whiteford et al. |
| 5,746,390 A | | 5/1998 | Chiappetta |
| 5,765,777 A | | 6/1998 | Schmittle |
| 5,765,783 A | * | 6/1998 | Albion ............... 244/7 B |
| 5,769,359 A | | 6/1998 | Rutan et al. |
| 5,842,687 A | | 12/1998 | David |
| 5,941,478 A | | 8/1999 | Schmittle |
| RE36,487 E | | 1/2000 | Wainfain |
| 6,168,117 B1 | | 1/2001 | Shinagawa |
| 6,170,778 B1 | * | 1/2001 | Cycon et al. ............... 244/6 |
| 6,293,141 B1 | | 9/2001 | Nance |
| 6,318,668 B1 | | 11/2001 | Ulanoski et al. |
| 6,328,259 B1 | | 12/2001 | Bolukbasi |
| 6,336,610 B1 | | 1/2002 | Wode |
| 6,343,768 B1 | | 2/2002 | Muldoon |
| 6,358,014 B1 | | 3/2002 | Chou et al. |
| 6,364,603 B1 | | 4/2002 | Czahor et al. |
| 6,382,556 B1 | | 5/2002 | Pham |
| 6,382,559 B1 | | 5/2002 | Sutterfield et al. |
| 6,471,198 B2 | | 10/2002 | Herbst |
| 6,474,603 B1 | | 11/2002 | Kinkead et al. |
| 6,539,290 B1 | | 3/2003 | Vos |
| 6,543,718 B2 | | 4/2003 | Provost |
| 6,547,180 B1 | | 4/2003 | Cassidy |
| 6,561,455 B2 | * | 5/2003 | Capanna ............... 244/7 R |
| 6,568,635 B2 | | 5/2003 | Carpenter |
| 6,592,071 B2 | | 7/2003 | Kinkead et al. |
| 6,751,946 B2 | | 6/2004 | Li |
| 6,783,096 B2 | | 8/2004 | Baldwin |
| 6,808,140 B2 | | 10/2004 | Moller |
| 2003/0127569 A1 | | 7/2003 | Bacon et al. |
| 2003/0141418 A1 | | 7/2003 | Darbyshire |
| 2004/0026563 A1 | | 2/2004 | Moller |

OTHER PUBLICATIONS http://www.tpub.com/content/aviation/14030/css/14030_205.htm (available on the web Sep. 26, 2003).*
http://www.grc.nasa.gov/WWW/K-12/airplane/pitot.html (available on the web May 22, 2000)*
Co-pending Application No.: UNASSIGNED, Inventor: Robert Parks, entitled "System and Method for Controlling a Roll Rate of a Torsionally-Disconnected Freewing Aircraft" filed Sep. 19, 2005.
Notification of Transmittal of the International Search Report and the Written Opinion, the International Search Report, and the Written Opinion for International Application No. PCT/US05/33231; mailed Aug. 8, 2007; 8 pages.
Athena Controls; GuideStar 111m; http://www.athenati.com/products_services/services/guidestar_gs-111m, 2 pages.
Athena Controls; GuideStar Flies on GoldenEye-50, Apr. 26, 2005; 1 page; http://www.athenati.com/news/press_releases/april_26_2005.
"International Preliminary Report on Patentability"; PCT/US2005/033231; Sep. 20, 2007; 2 pages.
T. M. Harris et al.; "Theoretical Investigation of Torsion Free Wing Flutter Models"; Air Force Flight Dynamics Laboratory Director of Science & Technology Air Force Systems Command; AFFDL-TM-76-93-FBR; Aug. 1976; 72 pages.
W. M. Moseley, Jr. et al.; "Stress and Weight Analysis of a Torsionally Free Wing System"; General Dynamics-Convair Aerospace Division; ERR-FW-1446; Jul. 15, 1973; 57 pages.
W. J. Moran; "ATF/TFW Feasibility Study—Performance Analyses"; General Dynamics-Convair Aerospace Division; ERR-FW-1459; Dec. 31, 1973; 19 pages.

I. C. Bhateley; "An Investigation of the Interference Between Fuselage and Wing at High Relative Incidence"; General Dynamics-Convair Aerospace Division; ERR-FW-1464; Dec. 31, 1973; 70 pages.

G. T. Joyce; "The Stability and Control Characteristics of a Torsion Free Wing Advanced Tactical Fighter"; General Dynamics-Convair Aerospace Division; ERR-FW-1451; Dec. 31, 1973; 50 pages.

Chuck Wilkins; "Team GoldenEye Selected for Phase II of DARPA OAV-II Program"; Aurora Flight Sciences Corp. Press release, APR-165; Jul. 13, 2004; 1 page.

Chuck Wilkins; "Team GoldenEye to Develop Organic Air Vehicle for DARPA"; Aurora Flight Sciences Press Release, APR-158; Dec. 7, 2004; 2 pages.

Notification of Transmittal of the International Search Report and the Written Opinion, the International Search Report, and the Written Opinion for International Application No. PCT/US05/33233; mailed Dec. 14, 2006; 12 pages.

"Freewing Scorpion UAV", http://www.scaled.com/projects/freewing.html; Nov. 16, 2006; 2 pages.

http://en.wikipedia.org/wiki/Inertial_measurement_unit; available on the web Nov. 27, 2002; 2 pages.

GoldenEye-50 Transition Images. Aurora Flight Sciences. http://www.aurora.aero/GE50/images/GE-transition.jpg; Nov. 28, 2006; 2 pages.

"GoldenEye's First Flight Successful." Aurora Flight Sciences Press Release, Jul. 16, 2003, with linked images. http://www.aurora.aero/news/APR-148.html; 9 pages.

GoldenEye-50 Transition Images. Apr. 26, 2005; further depicts GoldenEye-50 as disclosed in Garamone; http://www.aurora.aero/GE50/images/GE-transition.jpg; ; 2 pages.

Notification of Transmittal of the International Search Report and the Written Opinion, the International Search Report, and the Written Opinion for International Application No. PCT/US05/33000; mailed Jun. 28, 2007; 15 pages.

"International Preliminary Report on Patentability"; PCT/US2005/033000; Jul. 26, 2007; 12 pages.

Dr. Edward T. Smith; "Near-Term Demonstrations of GoldenEye-50 UAV with Options for Advanced Features"; Aurora Flight Sciences Corp.; Jun. 30, 2004; 5 pages.

"GoldenEye-50: A Proposal to Lockheed Martin; Aurora Proposal No. AP04-026"; Aurora Flight Science Corp.; Jun. 4, 2004; 12 pages.

Greg Slabodkin; "GoldenEye-100 UAV Successfully Completes Initial Flight Test Program"; Aurora Flight Sciences Corp. Press Release, APR-153; Apr. 7, 2004, 1 page, www.aurora.aero.

Dr. Edward T. Smith; "Feb. 12, 2004 Demonstration Summary: Reference to Proposal Number AP04-018"; Aurora Flight Sciences Corp.; Feb. 23, 2004; 5 pages.

"DARPA Heterogeneous Urban RSTA Team (HURT) Program: A Proposal in Response to Raytheon RFP REB012404.01; Aurora Proposal No. AP04-014"; Aurora Flight Sciences Corp.; Feb. 6, 2004; 19 pages.

"An Advanced Low-Observable UAV System For Remote Sensor Deployment: Aurora Proposal No. AP04-001"; Aurora Flight Sciences Corp.; Jan. 15, 2004; 21 pages.

Greg Slabodkin; "Aurora Announces Plans for GoldenEye-50 Unmanned Aerial Vehicle: VTOL Design Provides Versatile Tool for Homeland Security Applications"; Aurora Flight Sciences Corp. Press Release, APR-150; Dec. 4, 2003; 2 pages; www.aurora.aero.

"2nd AIAA Unmanned Unlimited Systems, Technologies and Operations—Aerospace, Land, and Sea Conference and Workshop & Exhibit: Event Agenda"; AIAA—American Institute of Aeronautics and Astronautics; Sep. 16, 2003; 6 pages; http://www.aiaa.org/agenda.cfm?lumeetingid=834&viewcon=agenda&pageview=2&programSeeview=1&dateget=16-Sep-03.html.

Carl G. Schaefer, Jr., et al.; "GoldenEye: The Clandestine UAV"; American Institute of Aeronautics and Astronautics; Sep. 16, 2003; 11 pages.

Dr. Edward T. White; "Golden Eye's First Flight Successful: Aurora Demonstrates Potential for a New Breed of Unmanned Aircraft"; Aurora Flight Sciences Corp. Press Release, APR-148; Sep. 8, 2003, 8 pages (with photos downloaded from website); http://aurora_aero/news/apr-148.html.

Jim Garamone; "UAVs Demonstrate the Future at Pax River Event"; American Forces Information Service News Articles, United States Department of Defense; Jul. 14, 2003; 7 pages (with photos downloaded from website); http://www.defenselink.mil/news/Jul2003/n07142003_200307144.html.

"GoldenEye-50 System Information Sheet"; Aurora Flight Sciences Corp.; Jul. 2003; 2 pages.

Carl G. Schaefer, Jr.; "GoldenEye: The Clandestine UAV"; Aurora Flight Sciences Corp; Sep. 16, 2003; 11 pages.

"GoldenEye-50 System Information Sheet"; Jul. 2003; 2 pages.

Greg Slabodkin;"Aurora Announces Plans for GoldenEye-50 Unmanned Aerial Vehicle"; Aurora Flight Sciences Press Release; APR-150; Dec. 4, 2003.

Greg Slabodkin; "GoldenEye-100 UAV Successfully Completes Initial Flight Test Program"; Aurora Flight Sciences Corp.; APR-153; Apr. 7, 2004.

Chuck Wilkins; "Team GoldenEye to Develop Organic Air Vehicle for DARPA: Aurora Flight Sciences Selected for Phase One of OAV-II Procurement"; Aurora Flight Sciences Corp.; APR-158; Dec. 7, 2004.

Chuck Wilkins; "GoldenEye-50 UAV Makes First Autonomous Transition Flights": Aurora Flight Sciences Corp.; APR-162; Apr. 26, 2005.

Chuck Wilkins; "Team GoldenEye Selected for Phase II of DARPA OAV-II Program"; Aurora Flight Sciences Corp.; APR-165; Jul. 13, 2005.

Chuck Wilkins; "GoldenEye-50 Performs First High-Speed, Coordinated Banked Turns: High-Speed Maneuver Demonstrates System's Real-World Capabilities"; Aurora Flight Sciences Corp.; APR-167; Oct. 18, 2005.

Chuck Wilkins; "Aurora's Golden Eye Surpasses Darpa Acoustic Requirements: Tests Validate Company's Quiet Ducted Fan Technology"; Aurora Flight Sciences Corp., APR-170; Dec. 13, 2005.

Chuck Wilkins; "GoldenEye-50 Passes 100 Flight Milestone: Former Technology Development Platform's Focus Shifts to Fielding"; Aurora Flight Sciences Corp.; APR-172; Mar. 20. 2006.

Chuck Wilkins; "Team GoldenEye Wins Phase III of DARPA OAV-II Program"; Aurora Flight Sciences Corp., APR-175; Jun. 13, 2006.

Chuck Wilkins; "Aurora's GoldenEye 80 Makes Successful First Flight"; Aurora Flight Sciences Corp.; APR-178; Nov. 6, 2006.

International Search Report & Written Opinion dated Nov. 19, 2007, issued in PCT/US05/33235 (10 pages).

NASA, Pitot-Static Tube, http://www.grc.nasa.gov/WWW/K-12/airplane/pilot.html.

http://en.wikipedia.org/wik/Moment_of_inertia; available on the web Feb. 19, 2008; 8 pages.*

International Search Report and Written Opinion; PCT/US05/33234; Feb. 29, 2008; 11 pages.*

* cited by examiner

INBOUND TRANSITION CONTROL FOR A TAIL-SITTING VERTICAL TAKE OFF AND LANDING AIRCRAFT

This application claims priority under 35 U.S.C. § 119(e) to U.S. Provisional Application No. 60/610,568, filed on Sep. 17, 2004, the entire contents of which are hereby incorporated by reference herein.

BACKGROUND

1. Field of the Invention

The present invention relates to vertical takeoff and landing (VTOL) aircraft. More particularly, the present invention relates to a system and method for inbound transition control for a tail-sitting VTOL aircraft.

2. Background Information

In a "tail sitter"-type vertical takeoff and landing (VTOL) aircraft, the fuselage is horizontal for normal flight and vertical for hover, takeoff and landing. The same propulsion system is used for forward flight and for hover. The propulsion system can either be a ducted fan or an external propeller/rotor. The body uses control surfaces that interact with the internal and/or external air flow to produce control moments that control the body attitude. At low flight speeds, the predominant air flow over these control surfaces is the air blown back by the propeller or fan that is producing the aircraft's thrust. The body may or may not have fixed wings or tail surfaces attached. The body can also have some type of "freewings" attached. The freewings are wing panels that are allowed to freely pivot about an axis that is substantially spanwise with respect to the fuselage of the aircraft. Freewings are described in, for example, U.S. Reissue Pat. No. RE36,487 to Wainfain, U.S. Pat. No. 5,340,057 to Schmittle, and U.S. Pat. No. 5,395,073 to Rutan et al, the entire contents of each of which are incorporated by reference herein. The wing panels have control surfaces mounted on them that control the angle of attack and thus the lift coefficient of the freewing panels. The panels automatically adjust themselves so that they maintain a constant angle of attack regardless of the flight path or wind gusts.

Alternatively, the freewing panels can be actively driven by actuators in a mode that emulates a freely pivoting wing panel. The freewing panels are located entirely outside of the air flow of the propulsion system. In the case of ducted fan propulsion, all of the ducted fan aircraft's high speed air flow is inside the duct, so the free wings can be mounted anywhere on the outside the duct. In the case of a propeller, there are fixed wings attached to the body, with the wing span at least to the outer edge of the propeller slipstream, and only the wing panels outboard of the duct are pivoted as freewings. As known to those of ordinary skill in the art, a ducted fan VTOL aircraft with wings is much more efficient in horizontal flight than one that is just a duct. The area and span of the wings allows efficient low speed loiter, increases the maximum altitude and can increase the maximum level flight speed. However, there are several problems with conventional ducted fan VTOL aircraft.

For example, conventional ducted fan VTOL aircraft are sensitive to gusts while hovering. A tail sitter VTOL aircraft with wings that are predominantly vertical in the hover mode, either with fixed wings or with freewings, is extremely difficult to hover, takeoff or land in gusty winds. The total area of the wings is exposed to gusts, thus producing large forces and moments that the control system must overcome. In addition, these undesired loads can change dramatically depending on the orientation of the aircraft relative to the wind direction. Thus, the sensor payloads on the aircraft cannot be aimed in desired directions while the aircraft is hovering.

In addition, these type of aircraft require high power to hover in wind. A VTOL tail sitter aircraft with predominantly vertical wings has a very large area exposed to even a steady wind. Due to the high angle of attack of the wings, the wings will be fully stalled. If the aircraft must hover over a given location in wind, the fully-stalled wings have very high drag forces in the horizontal direction, while producing little or no lift. Thus, the main body must tilt enough so that the main thruster is producing enough horizontal thrust to overcome the high drag. The tilt reduces the available vertical thrust, thus requiring the engine to be operated at a higher power setting. Alternatively, the weight of the aircraft must be reduced by reducing fuel or payload, so that the engine has enough thrust to keep the airplane in the air.

SUMMARY OF THE INVENTION

A system and method are disclosed for inbound transition control of a tail-sitting vertical takeoff and landing (VTOL) aircraft. In accordance with exemplary embodiments of the present invention, according to a first aspect of the present invention, a system for controlling inbound transition of a tail-sitting VTOL aircraft includes a fuselage, and a first freewing and a second freewing pivotably mounted on opposing sides of the fuselage. The system includes an airspeed sensor. The airspeed sensor is configured to determine an airspeed of the aircraft and to output an airspeed indication signal. The system includes a controller in communication with the airspeed sensor to receive the airspeed indication signal. The controller is configured to increase thrust of an engine of the aircraft to substantially maximum for inbound transition. The controller is configured to generate a pitch control signal and a freewing control signal in response to the airspeed indication signal. The system includes at least one actuator in communication with the controller. The at least one actuator is configured to actuate control surfaces of the aircraft in response to the pitch control signal to rapidly increase a pitch of the fuselage to decelerate the aircraft. The at least one actuator is configured to actuate control surfaces of the first and second freewings in response to the freewing control signal to adjust lift produced by the first and second freewings to oppose climbing of the aircraft due to the increase in the thrust of the engine and the increase in the pitch of the fuselage. The controller is configured to decrease the thrust of the engine as the aircraft decelerates until the aircraft is in a hover mode.

According to the first aspect, the controller can be configured to determine a flight path of the aircraft for inbound transition. The system can include an inertial sensor in communication with the controller. The inertial sensor can be configured to generate inertial guidance signals. The controller can be configured to control the at least one actuator to actuate the control surfaces of the first and second freewings in response to the inertial guidance signals to maintain the determined flight path. The controller can be configured to further decrease the thrust of the engine to land the aircraft from the hover mode. The controller can be configured to control the at least one actuator to actuate the control surfaces of the first and second freewings to adjust the lift produced by the first and second freewings to be negative to oppose climbing by the aircraft due to the increase in the thrust of the engine and the increase in the pitch of the fuselage. The controller can be configured to control the at least one actuator to actuate the control surfaces of the aircraft to increase the pitch of the fuselage greater than perpendicular with respect to ground to further assist in deceleration of the aircraft. The controller can be configured to cause the aircraft to descend as the pitch of the fuselage is increased.

According to the first aspect, the airspeed sensor can include a pitot tube mounted on a boom on a fore portion of at least one of the first freewing and the second freewing. The pitot tube can be configured to balance a weight of the at least one of the first freewing and the second freewing. The controller can be configured to control the at least one actuator to actuate the control surfaces of the first and second freewings to alter an angle of attack of the first and second freewings to produce substantially zero lift in the hover mode. The controller can be configured to control the at least one actuator to actuate the control surfaces of the first and second freewings to alter an angle of attack of the first and second freewings to produce a positive lift to increase performance of the aircraft. The aircraft can comprise, for example, a ducted fan VTOL aircraft or the like. The first and second freewings can each be independently pivotably mounted on the opposing sides of the fuselage.

According to a second aspect of the present invention, a system for controlling inbound transition of a tail-sitting VTOL aircraft includes a sensor circuit. The sensor circuit is configured to determine an airspeed of the aircraft and to output an airspeed indication signal. The aircraft includes a first freewing and a second freewing pivotably mounted on opposing sides of a fuselage of the aircraft. The system includes a control circuit in communication with the sensor circuit to receive the airspeed indication signal. The control circuit is configured to increase a throttle of an engine of the aircraft to substantially maximum for inbound transition. The control circuit is configured to generate a pitch control signal and a freewing control signal in response to the airspeed indication signal. The system includes a control surface actuator in communication with the control circuit. The control surface actuator is configured to actuate control surfaces of the aircraft in response to the pitch control signal to rapidly increase a pitch of the fuselage to decelerate the aircraft. The control surface actuator is configured to actuate control surfaces of the first and second freewings in response to the freewing control signal to adjust lift produced by the first and second freewings to oppose climbing of the aircraft due to the increase in the throttle of the engine and the increase in the pitch of the fuselage. The control circuit is configured to decrease the throttle of the engine as the aircraft decelerates until the aircraft is in a hover mode.

According to the second aspect, the control circuit can be configured to determine a flight path of the aircraft for inbound transition. The system can include an inertial sensor in communication with the control circuit. The inertial sensor can be configured to generate inertial guidance signals. The control circuit can be configured to control the control surface actuator to actuate the control surfaces of the first and second freewings in response to the inertial guidance signals to maintain the determined flight path. The control circuit can be configured to further decrease the throttle of the engine to land the aircraft from the hover mode. The control circuit can be configured to control the control surface actuator to actuate the control surfaces of the first and second freewings to adjust the lift produced by the first and second freewings to be negative to oppose climbing by the aircraft due to the increase in the throttle of the engine and the increase in the pitch of the fuselage. The control circuit can be configured to control the control surface actuator to actuate the control surfaces of the aircraft to increase the pitch of the fuselage greater than perpendicular with respect to ground to further assist in deceleration of the aircraft. The control circuit can be configured to cause the aircraft to descend as the pitch of the fuselage is increased.

According to the second aspect, the sensor circuit can comprise a pitot tube mounted on a boom on a fore portion of at least one of the first freewing and the second freewing. The pitot tube can be configured to balance a weight of the at least one of the first freewing and the second freewing. The control circuit can be configured to control the control surface actuator to actuate the control surfaces of the first and second freewings to alter an angle of attack of the first and second freewings to produce substantially zero lift in the hover mode. The control circuit can be configured to control the control surface actuator to actuate the control surfaces of the first and second freewings to alter an angle of attack of the first and second freewings to produce a positive lift to increase performance of the aircraft. The aircraft can comprise, for example, a ducted fan VTOL aircraft or the like. The first and second freewings can each be independently pivotably mounted on the opposing sides of the fuselage.

According to a third aspect of the present invention, a system for controlling inbound transition of a tail-sitting VTOL aircraft includes a fuselage, and a first freewing and a second freewing pivotably mounted on opposing sides of the fuselage. The system includes means for determining airspeed of the aircraft. The airspeed determining means is configured to output an airspeed indication signal. The system includes means for controlling the aircraft in communication with the airspeed determining means to receive the airspeed indication signal. The controlling means is configured to increase thrust of an engine of the aircraft to substantially maximum for inbound transition. The controlling means is configured to generate a pitch control signal and a freewing control signal in response to the airspeed indication signal. The system includes at least one actuating means in communication with the controlling means for actuating control surfaces of the aircraft in response to the pitch control signal to rapidly increase a pitch of the fuselage to decelerate the aircraft, and for actuating control surfaces of the first and second freewings in response to the freewing control signal to adjust lift produced by the first and second freewings to oppose climbing of the aircraft due to the increase in the thrust of the engine and the increase in the pitch of the fuselage. The controlling means is configured to decrease the thrust of the engine as the aircraft decelerates until the aircraft is in a hover mode.

According to the third aspect, the controlling means can be configured to determine a flight path of the aircraft for inbound transition. The system can include means for generating inertial guidance signals in communication with the controlling means. The controlling means can be configured to control the at least one actuating means to actuate the control surfaces of the first and second freewings in response to the inertial guidance signals to maintain the determined flight path. The controlling means can be configured to further decrease the thrust of the engine to land the aircraft from the hover mode. The controlling means can be configured to control the at least one actuating means to actuate the control surfaces of the first and second freewings to adjust the lift produced by the first and second freewings to be negative to oppose climbing by the aircraft due to the increase in the thrust of the engine and the increase in the pitch of the fuselage. The controlling means can be configured to control the at least one actuating means to actuate the control surfaces of the aircraft to increase the pitch of the fuselage greater than perpendicular with respect to ground to further assist in deceleration of the aircraft. The controlling means can be configured to cause the aircraft to descend as the pitch of the fuselage is increased.

According to the third aspect, the airspeed determining means can comprise a pitot tube means mounted on a boom on a fore portion of at least one of the first freewing and the second freewing. The pitot tube means can be configured to balance a weight of the at least one of the first freewing and the second freewing. The controlling means can be configured to control the at least one actuating means to actuate the control surfaces of the first and second freewings to alter an angle of attack of the first and second freewings to produce substantially zero lift in the hover mode. The controlling means can be configured to control the at least one actuating means to actuate the control surfaces of the first and second freewings to alter an angle of attack of the first and second freewings to produce a positive lift to increase performance of the aircraft. The aircraft can comprise, for example, a ducted fan VTOL aircraft or the like. The first and second freewings can each be independently pivotably mounted on the opposing sides of the fuselage.

According to a fourth aspect of the present invention, a system for controlling inbound transition of a tail-sitting VTOL aircraft includes means for sensing an airspeed of the aircraft. The airspeed sensing means is configured to output an airspeed indication signal. The aircraft includes a first freewing and a second freewing pivotably mounted on opposing sides of a fuselage of the aircraft. The system includes a controller means for controlling the aircraft in communication with the airspeed sensing means to receive the airspeed indication signal. The controller means is configured to increase a throttle of an engine of the aircraft to substantially maximum for inbound transition. The controller means is configured to generate a pitch control signal and a freewing control signal in response to the airspeed indication signal. The system includes a control surface actuating means in communication with the controller means for actuating control surfaces of the aircraft in response to the pitch control signal to rapidly increase a pitch of the fuselage to decelerate the aircraft, and for actuating control surfaces of the first and second freewings in response to the freewing control signal to adjust lift produced by the first and second freewings to oppose climbing of the aircraft due to the increase in the throttle of the engine and the increase in the pitch of the fuselage. The controller means is configured to decrease the throttle of the engine as the aircraft decelerates until the aircraft is in a hover mode.

According to the fourth aspect, the controller means can be configured to determine a flight path of the aircraft for inbound transition. The system can include means for generating inertial guidance signals in communication with the controller means. The controller means can be configured to control the control surface actuating means to actuate the control surfaces of the first and second freewings in response to the inertial guidance signals to maintain the determined flight path. The controller means can be configured to further decrease the throttle of the engine to land the aircraft from the hover mode. The controller means can be configured to control the control surface actuating means to actuate the control surfaces of the first and second freewings to adjust the lift produced by the first and second freewings to be negative to oppose climbing by the aircraft due to the increase in the throttle of the engine and the increase in the pitch of the fuselage. The controller means can be configured to control the control surface actuating means to actuate the control surfaces of the aircraft to increase the pitch of the fuselage greater than perpendicular with respect to ground to further assist in deceleration of the aircraft. The controller means can be configured to cause the aircraft to descend as the pitch of the fuselage is increased.

According to the fourth aspect, the airspeed sensing means can comprise a pitot tube means mounted on a boom on a fore portion of at least one of the first freewing and the second freewing. The pitot tube means can be configured to balance a weight of the at least one of the first freewing and the second freewing. The controller means can be configured to control the control surface actuating means to actuate the control surfaces of the first and second freewings to alter an angle of attack of the first and second freewings to produce substantially zero lift in the hover mode. The controller means can be configured to control the control surface actuating means to actuate the control surfaces of the first and second freewings to alter an angle of attack of the first and second freewings to produce a positive lift to increase performance of the aircraft. The aircraft can comprise, for example, a ducted fan VTOL aircraft or the like. The first and second freewings can each be independently pivotably mounted on the opposing sides of the fuselage.

According to a fifth aspect, a method of controlling inbound transition of a tail-sitting VTOL aircraft includes the steps of: a.) increasing a throttle of an engine of the aircraft to substantially maximum, wherein the aircraft includes a first freewing and a second freewing pivotably mounted on opposing sides of a fuselage of the aircraft; b.) rapidly increasing a pitch of the fuselage of the aircraft, in response to an airspeed of the aircraft, to decelerate the aircraft; c.) adjusting lift produced by the first freewing and second freewing to oppose climbing of the aircraft due to the increase in the throttle of the engine and the increase in the pitch of the fuselage; and d.) decreasing the throttle of the engine as the aircraft decelerates until the aircraft is in a hover mode.

According to the fifth aspect, the method can include the steps of: e.) determining a flight path of the aircraft for inbound transition; f.) generating inertial guidance signals; and g.) adjusting the first and second freewings in response to the inertial guidance signals to maintain the determined flight path. Step (d) can include the step of: h.) further decreasing the throttle of the engine to land the aircraft from the hover mode. Step (c) can include the step of: i.) adjusting the lift produced by the first and second freewings to be negative to oppose climbing by the aircraft due to the increase in the throttle of the engine and the increase in the pitch of the fuselage. Step (b) can include the step of: j.) increasing the pitch of the fuselage greater than perpendicular with respect to ground to further assist in deceleration of the aircraft. The method can include the step of: k.) descending the aircraft as the pitch of the fuselage is increased. A pitot tube can be mounted on a boom on a fore portion of at least one of the first freewing and the second freewing for measuring the airspeed of the aircraft. The pitot tube can balance a weight of the at least one of the first freewing and the second freewing. The method can include the steps of: l.) altering an angle of attack of the first and second freewings to produce substantially zero lift in the hover mode; and m.) altering an angle of attack of the first and second freewings to produce a positive lift to increase performance of the aircraft. The aircraft can comprise, for example, a ducted fan VTOL aircraft or the like. The first and second freewings can each be independently pivotably mounted on the opposing sides of the fuselage.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
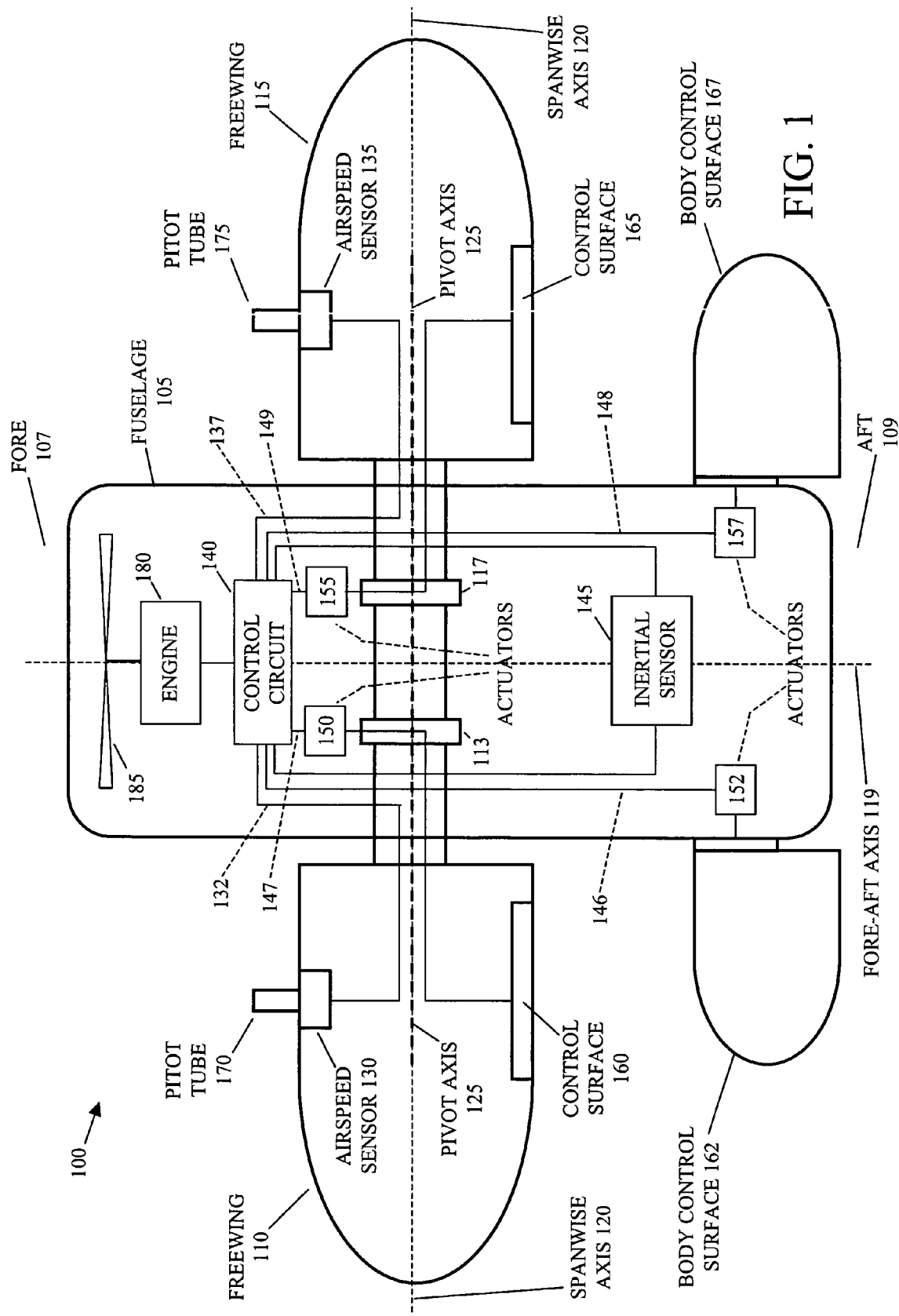
FIG. 1 is a diagram illustrating a system for controlling the inbound transition of a tail-sitting vertical take-off and landing (VTOL) aircraft, in accordance with an exemplary embodiment of the present invention.

Exemplary embodiments of the present invention are directed to a system and method for inbound transition for a tail-sitting vertical take-off and landing (VTOL) aircraft, such as, for example, a tail-sitting ducted fan VTOL aircraft that uses freewings, or the like.

To hover and/or land, a tail-sitting VTOL aircraft reorients its body from a substantially horizontal attitude in forward flight to a vertical attitude for hover and landing (both orientations being with respect to the ground or other landing surface). Such a pitch up maneuver can place critical demands on the control system. Additionally, there can also be a risk of "stalling" the propeller (e.g., in the case of an external rotor), or the inlet lip and fan rotor (e.g., in the case of a ducted fan). Given the thrust vectoring controls of the tail-sitting VTOL aircraft, there can be more control power available when the engine is at high throttle than when it is at reduced thrust. During the inbound transition, the maneuvers can be limited by the available thrust level, so it is advantageous to have a high thrust level during the maneuver. In addition, at high throttle, the fan or propeller can be more resistant to stalling when at a large angle of attack, so a high power setting is also advantageous.

However, a problem with high power and high thrust is that the tail-sitting VTOL aircraft will tend to climb and accelerate, while descent and deceleration are desired in the landing approach. Such a situation is particularly evident as the propulsion system pitches up and there is a significant vertical thrust. Conventionally, tail-sitting VTOL aircraft have used either very careful maneuvers to make this transition in nearly level flight, or the tail-sitting VTOL aircraft performed a one-quarter-loop-type pitch up maneuver to make the transition. In the former situation, the required low throttle can place significant limits on the aircraft design, and require a relatively long time and long distance to complete the maneuver. In the latter situation, the result can be that the aircraft ends up in hover at a much higher altitude than desired, and then has to perform a long, slow, backwards descent to landing. With military vehicles, such a long, slow descent can result in an extended period of time in which the aircraft is particularly vulnerable to attack.

Accordingly, exemplary embodiments of the present invention provide an improved control system and method for such tail-sitting VTOL aircraft that can eliminate such problems, and provide for a very rapid transition from forward flight to hover. According to exemplary embodiments, the control system or flight computer of the tail-sitting VTOL aircraft can issue suitable commands or signals to position the tail-sitting VTOL aircraft for landing approach, in descending flight, above the aircraft's stall speed. The desired flight path is determined by the control system. At a predetermined point during inbound transition, the control system controls the engine to go to maximum thrust. The control system also commands the fuselage or body of the aircraft to pitch up as rapidly as possible, while still maintaining adequate control margins.

As the body pitches up, the aircraft will tend to climb. The control system can command the freewings of the aircraft to adjust their lift to maintain the desired flight path. Such a situation can result in the lift of the wings being downwards to oppose the climbing tendency. The body of the aircraft can then be at a high angle of attack, so there will be little forward component to the thrust, and, at the same time, the aerodynamic drag can be very high. Consequently, rapid deceleration of the body can result. With a suitable control and stall margin, the control system can control the body of the aircraft to be tilted past vertical orientation, so that a component of the thrust can aid the deceleration. According to exemplary embodiments, as the velocity decreases, the available downward lift from the wing decreases, so the control system can reduce the throttle, eventually reaching a setting where thrust is equal to the weight of the aircraft. The tail-sitting VTOL aircraft will then be in a hover mode. Additionally, the control system can control the transition path of the aircraft to descend as the body pitches up. Such control allows for a rapid landing, while still clearing obstacles near the ground, such as, for example, trees, buildings or the like.

With the body of the aircraft operating at potentially large angles of attack during the transition, it may be difficult to get effective measurements of airspeed with, for example, a pitot tube mounted on the body. According to exemplary embodiments, more accurate and effective airspeed readings can be obtained by mounting the pitot tube on a short boom in front of one or both of the freewings. While the freewing angle of attack can vary according to the amount of lift it is commanded to produce, the angle of attack can be relatively small to avoid wing stall. Such a range can be within the range of angles of attack for which a pitot tube can produce accurate airspeed data. By mounting the pitot tube on a boom in front of the freewing, the pitot tube and boom can become part of the balance weight used by a freely pivoting freewing, so that the overall weight penalty can be minimal.

These and other aspects of the present invention will now be described in greater detail. FIG. 1 is a diagram illustrating a system for controlling the inbound transition of a tail-sitting VTOL aircraft 100, in accordance with an exemplary embodiment of the present invention. As used herein, "freewings" are wings that are configured to freely rotate about the spanwise or wingspan axis of the aircraft 100 using, for example, a tube or the like connecting one freewing to the other through the body or fuselage of the aircraft 100, thereby coupling one freewing to the other.

The aircraft 100 includes a body or fuselage 105 with a fore 107 and an aft 109. The aircraft 100 includes a first freewing 110 and a second freewing 115, such as left and right freewings, respectively, with respect to a fore-aft axis 119 of the aircraft 100. According to exemplary embodiments, each of the first and second freewings 110 and 115 is configured to be mounted on opposing sides of the fuselage 105 of the aircraft 100, for example, along a spanwise axis 120. Additionally, the first and second freewings 110 and 115 are configured to be freely pivotable about a pivot axis, such as a pivot axis 125. Each of the first and second freewings 110 and 115 can be mounted at or to the fuselage 105 at any suitable location of the fuselage 105. Additionally, the first and second freewings 110 and 115 can be mounted to the fuselage 105 using any suitable type of mount, such as, for example, first and second pivot mounts 113 and 117. According to an alternative exemplary embodiment, the first and second pivot mounts 113 and 117 can comprise any suitable type of gear or linkage mechanism that can be configured to rotate or otherwise pivot the first and second freewings 110 and 115 mechanically upon appropriate activation.

The aircraft 100 can also include one or more dynamic pressure or airspeed sensors configured to measure the dynamic pressure or airspeed of the aircraft 100 and to output an airspeed indication signal. For example, the aircraft 100 can include a first airspeed sensor 130 located on or in the first freewing 110, and a second airspeed sensor 135 located on or in the second freewing 115, although a single airspeed sensor can be located at any suitable location in or on the fuselage 105 or either freewing of the aircraft 100. For example, the first and second airspeed sensors 130 and 135 can be configured to supply first and second airspeed signals 132 and 137.

The aircraft 100 includes a controller, control processor or other suitable type of control circuit 140 in communication with the airspeed sensor(s), such as the first and second airspeed sensors 130 and 135. The control circuit 140 is configured to receive the airspeed indication signal from the airspeed sensor, such as the first and second airspeed signals 132 and 137 from first and second airspeed sensors 130 and 135, respectively. According to exemplary embodiments, the control circuit 140 is configured to increase the thrust of an engine 180 of the aircraft 100 to substantially maximum for inbound transition. Thus, the control circuit 140 is in communication with the engine 180 and configured to control the thrust or throttle of the engine 180. The engine 180 can be any suitable type of engine capable of driving a propeller (e.g., for an external rotor) or fan rotor 185 (e.g., for a ducted fan aircraft) to propel the aircraft 100. The control circuit 140 is further configured to generate a pitch control signal and a freewing control signal in response to the airspeed indication signal.

The aircraft 100 includes one or more servo mechanisms or control actuators in communication with the control circuit 140. For example, the aircraft 100 can include a first control actuator 150 and a second control actuator 155, although a single control actuator can be used for each of the first and second freewings 110 and 115. The first control actuator 150 is in communication with a first aileron, airfoil or other suitable type of control surface 160. The first control surface 160 can be located on or along, for example, the trailing (e.g., aft) edge or surface of the first freewing 110. The second control actuator 155 is in communication with a second aileron, airfoil or other suitable type of control surface 165. The second control surface 165 can be located on or along, for example, the trailing (e.g., aft) edge or surface of the second freewing 115. However, the first and second control surfaces 160 and 165 can be positioned at any suitable location on or along the first and second freewings 110 and 115, respectively.

The aircraft 100 can include a third control actuator 152 and a fourth control actuator 157, although a single control actuator can be used for both the third and fourth control actuators 152 and 157 (or for all four control actuators or any combination thereof). The third control actuator 152 is in communication with a first body control surface 162. The fourth control actuator 157 is in communication with a second body control surface 167. The first and second body control surfaces 162 and 167 are configured to control the pitch of the fuselage 105. The first and second body control surfaces 162 and 167 can comprise any suitable combination of control surfaces that are capable of altering or otherwise controlling the pitch of the fuselage 105, such as, for example, aircraft tails, thrust vectoring controls (e.g., movable nozzles or control vanes in the high-speed exhaust flow of a ducted fan), combinations thereof, or the like. Thus, the first and second body control surfaces 162 and 167 can be positioned at any suitable location on, along or in the fuselage 105 to appropriately control the pitch of the fuselage. According to exemplary embodiments, the third and fourth control actuators 152 and 157 are configured to actuate or otherwise suitable deflect the first and second body control surfaces 162 and 167, respectively, in response to the pitch control signal from the control circuit 140 to rapidly increase the pitch of the fuselage 105 to decelerate the aircraft 100.

The control circuit 140 is configured to determine the flight path of the aircraft 100 for inbound transition. For example, a predetermined flight path can be stored in the control circuit 140, or the flight path can be relayed to the control circuit 140 remotely (e.g., via a suitable wireless transmitter or transceiver or the like) from a remote operator. The aircraft 100 can include an inertial sensor 145 in communication with the control circuit 140. The inertial sensor 145 is configured to generate suitable inertial guidance signals in accordance with the determined flight path. For example, the control circuit 140 can be configured to control the first and second control actuators 150 and 155 to actuate the first and second control surfaces 160 and 165 of the first and second freewings 110 and 115, respectively, and to control the third and fourth control actuators 152 and 157 to actuate the first and second body control surfaces 162 and 167, respectively, all in response to the inertial guidance signals to maintain the determined flight path.

For inbound transition for the determined flight path, the control circuit 140 can be configured to issue suitable commands or signals to position the aircraft 100 for landing approach, in descending flight, above the stall speed of the aircraft 100. The stall speed of the aircraft 100 will depend upon such factors as, for example, the size, make, type, weight and other like factors of the aircraft 100, and can be determined by, for example, analysis or test (e.g., in a wind tunnel or the like). According to an exemplary embodiment, the control circuit 140 can alter the thrust or throttle of the engine 180 so that the velocity of the aircraft 100 is close to, but greater than, the stall speed of the aircraft 100.

At a predetermined point in the landing approach (e.g., according to the determined flight path), the control circuit 140 can increase the thrust or throttle of the engine 180 to substantially maximum thrust. The control circuit 140 can also command the fuselage 105 to pitch upwards (e.g., in a direction substantially opposite to or away from the ground) as rapidly as possible, while still maintaining adequate control margins. Thus, the control circuit 140 can output a first pitch control signal 146 and a second pitch control signal 148 to the third and fourth control actuators 152 and 157, respectively, although a single pitch control signal can be issued to the third and fourth control actuators 152 and 157. Accordingly, the third and fourth control actuators 152 and 157 can be configured to suitably deflect the first and second body control surfaces 162 and 167, respectively, to cause the rapid pitch up of the fuselage 105. The amount of pitch up can be predetermined, for example, by analysis or test (e.g., from appropriate wind tunnel tests) and stored in the control circuit 140.

As the fuselage 105 pitches up, the aircraft 100 will tend to climb. The control circuit 140 can issue a suitable freewing control signal to command the first and second freewings 110 and 115 to adjust their lift to maintain the desired flight path. For example, the control circuit 140 can output a first freewing control signal 147 and a second freewing control signal 149 to the first and second control actuators 150 and 155, respectively, although a single freewing control signal can be issued to the first and second control actuators 150 and 155. Thus, the first and second control actuators 150 and 155 can be configured to actuate the first and second control surfaces 160 and 165 in response to the first and second freewing control signals 147 and 149, respectively, to adjust the lift produced by the first and second freewings 110 and 115 to oppose climbing of the aircraft 100 due to the increase in the thrust of the engine 180 and the increase in the pitch of the fuselage 105.

Accordingly, the first and second control actuators 150 and 155 can be configured to suitably deflect the first and second control surfaces 160 and 165, respectively, to suitably adjust the lift produced by the first and second freewings 110 and 115. It is noted that such a situation can result in the lift of the first and second freewings 110 and 115 being downwards (e.g., pointing in a direction substantially towards ground) to oppose the climbing tendency of the aircraft 100. In other words, the control circuit 140 can be configured to control the first and second control actuators 150 and 155 to suitably deflect the first and second control surfaces 160 and 165 (e.g., using first and second freewing control signals 147 and 149) to adjust the lift produced by the first and second freewings 110 and 115, respectively, to be negative to oppose climbing by the aircraft 100 due to the increase in the thrust of the engine 180 and the increase in the pitch of the fuselage 105.

In such a configuration, the fuselage 10S can be at a high angle of attack, resulting in little forward component to the thrust and high aerodynamic drag. Consequently, very rapid deceleration of the aircraft 100 can result. With a suitable control and stall margin, the control circuit 140 can control the fuselage 105 to be tilted past the vertical (e.g., past perpendicular orientation with the ground), so that a component of the thrust can aid the deceleration. Thus, the control circuit 140 can be configured to control the third and fourth control actuators 152 and 157 to suitably deflect the first and second body control surfaces 162 and 167 (e.g., using first and second pitch control signals 146 and 148) to increase the pitch of the fuselage 105 greater than perpendicular with respect to the ground to further assist in deceleration of the aircraft 100.

According to exemplary embodiments, as the velocity of the aircraft 100 decreases, the available downward lift from the first and second freewings 110 and 115 decreases. Consequently, the control circuit 140 can reduce the engine throttle to reach a throttle setting where thrust is equal to the weight of the aircraft 100. In other words, the control circuit 140 can be configured to decrease the thrust of the engine 180 as the aircraft 100 decelerates until the aircraft 100 is hovering. At such point, the aircraft 100 will be in a hover mode. According to an additional exemplary embodiment, the control circuit 140 can control the transition path of the aircraft 100 to descend as the fuselage 105 pitches up. In other words, the control circuit 140 can be configured to cause the aircraft 100 to descend as the pitch of the fuselage 105 is increased (e.g., by further reducing the throttle of the engine 180, suitably altering the lift provided by the first and second freewings 110 and 115, suitably designing the configuration of the aircraft 100 or the like). Such control can provide for a rapid landing of the aircraft 100, while still allowing for clearing of obstacles near the ground, such as, for example, trees, buildings or the like. The control circuit 140 can also be configured to further decrease the thrust provided by the engine 180 to land the aircraft 100 from the hover mode to safely touch down on the ground or other surface. Those of ordinary skill will recognize that a similar sequence of commands and signals, applied in a substantially reverse order by the control circuit 140, can be used for lift-off, hover, and then flight of the aircraft 100 for outbound transition. For example, in the case of outbound transition, the first and second freewings 110 and 115 can provide upward lift to allow more of the engine thrust to be used to accelerate the aircraft 100.

According to an alternative exemplary embodiment, to reduce the power requirements of the tail-sitting VTOL aircraft 100 while hovering in wind, the first and second freewings 110 and 115 can be commanded to an angle of attack in which the freewings produce substantially zero lift. In other words, the control circuit 140 can be configured to control the first and second control actuators 150 and 155 (e.g., using the first and second freewing control signals 147 and 149) to suitably deflect the first and second control surfaces 160 and 165, respectively, to alter the angle of attack of the first and second freewings 110 and 115 to produce zero or substantially zero lift in the hover mode. The appropriate angle of attack can be determined, for example, by suitable wind tunnel tests or by other suitable analysis of the aircraft 100, as the appropriate angle of attack will depend on such factors as, for example, the size, shape, weight and configuration of the aircraft 100, ad other like factors. In such a control setting, the first and second freewings 110 and 115 can rapidly align themselves with wind gusts, such that the freewings can stay at zero or substantially zero lift. When at zero or substantially zero lift, the first and second freewings 110 and 115 can also be at an angle of attack that produces substantially low drag. The zero or substantially zero lift and low drag can result in minimal forces and moments being produced by wind gusts. Consequently, the requirements on the control circuit 140 can be reduced, and the additional thrust that was previously used to maintain hover in wind gusts can instead be used for lifting the aircraft 100.

Additionally, as a result of the low drag of the first and second freewings 110 and 115, the fuselage 105 can be tilted less in a steady wind to overcome drag. The savings in thrust from the reduced tilt can therefore result in more power being available to lift the aircraft 100. However, in a strong wind, the first and second freewings 110 and 115 can be commanded to produce positive lift to ease the work of the engine 180. In other words, the control system 140 can be configured to control the first and second control actuators 150 and 155 (e.g., using the first and second freewing control signals 147 and 149) to suitably deflect the first and second control surfaces 160 and 165, respectively, to alter the angle of attack of the first and second freewings 110 and 15 to produce positive lift to increase the performance of the aircraft 100. Accordingly, any suitable combination of airspeed measurements (e.g., from first and second airspeed sensors 130 and 135) and inertial or global positioning system (GPS) measurements (e.g., from inertial sensor 145) can be provided to the control circuit 140. The control circuit 140 can be configured to generate an estimate of the wind speed using the supplied measurements and a suitable algorithm. With such a measure of wind speed, the control circuit 140 can appropriately command the angle of attack of the first and second freewings 110 and 115 as discussed.

Of course, the first and second freewings 110 and 115 can maintain the commanded angle of attack relative to any gusts, but it will be evident that gusts can disturb the attitude of the aircraft 100 more than if the first and second freewings 110 and 115 were producing, for example, positive lift. The control circuit 140 can determine, in any suitable manner, the amount of lift that the first and second freewings 110 and 115 should provide. For example, when taking off, and the aircraft is heavy with a full fuel load, the first and second freewings 110 and 115 can be used to assist in lifting the aircraft 100. Later in the flight, when a stable platform is needed for good sensor performance by, for example, the reconnaissance sensors mounted on the aircraft, the control circuit 140 can position the first and second freewings 110 and 115 for zero or substantially zero lift and minimal sensitivity to gusts.

For example, the control circuit 140 can store a look-up table or other suitable algorithm than can cross-reference the current stage of the flight path (e.g., lift-off, full flight, descent, hover or the like) with the corresponding configuration of the body control surfaces and freewings for the given stage to generate the appropriate pitch and freewing control signals, respectively. The look-up table or algorithm can contain or use other factors or variables, such as airspeed, wind speed or the like, to appropriately modify the pitch and freewing control signals to suitably adjust the first and second body control surfaces 162 and 165 and first and second freewings 110 and 115, respectively. As noted previously, the values of such variables contained in such a look-up table will depend on numerous factors, such as, for example, the size, weight, configuration and type of aircraft 100, and can be determined by, for example, appropriate wind tunnel tests or other similar analysis based on the aircraft 100 used.

During inbound transition, the fuselage 105 of the aircraft 100 can operate at potentially large angles of attack during the transition. Accordingly, it may be difficult to procure effective measurements of airspeed with, for example, a pitot tube mounted on the body. According to exemplary embodiments, more accurate and effective airspeed readings can be obtained by mounting the pitot tube on a short boom in front of one or both of the first and second freewings 110 and 115. In other words, the first and second airspeed sensors 130 and 135 can include first and second pitot tubes 170 and 175, respectively mounted on a boom on a fore portion of each of the first and second freewings 110 and 115 (although a single pitot tube and boom can be mounted on either of the freewings). Any suitable type of pitot tube can be used for measuring the airspeed. Each of the first and second pitot tubes 170 and 175 and lengths and sizes of the corresponding booms are configured to appropriately balance the weight of the first and second freewings 110 and 115. While the angle of attack of the first and second freewings 110 and 115 can vary according to the amount of lift the freewings are commanded to produce by the control circuit 140, the angle of attack can be relatively small to avoid wing stall. Such a range can be within the range of angles of attack for which a suitable pitot tube can produce accurate airspeed data. By mounting the first and second pitot tubes 170 and 175 on corresponding booms in front of the first and second freewings 110 and 115, the pitot tubes and booms can become part of the balance weight used by the freely-pivoting freewings, so that the overall weight penalty can be minimal.

According to exemplary embodiments, the aircraft 100 can be any suitable type of tail-sitting VTOL aircraft, such as, for example, a tail-sitting ducted fan VTOL aircraft or the like. According to an alternative exemplary embodiment, instead of coupled freewings, the aircraft 100 can use torsionally-disconnected freewings. As used herein, "torsionally-disconnected freewings" are freewings that do not use a tube connecting one freewing to the other through the fuselage 105 of the aircraft 100, thereby decoupling the first freewing 110 from the second freewing 115. Thus, according to the alternative exemplary embodiment, each of the first and second freewings 110 and 115 can be configured to be separately mounted to the fuselage 105 of the aircraft 100. Additionally, each of the first and second freewings 110 and 115 can be configure to be independently freely pivotable about respective pivot axes. Torsionally-disconnected freewings are described in, for example, co-pending U.S. patent application Ser. No. 11/228,351, entitled "System and Method for Controlling a Roll Rate of a Torsionally-Disconnected Freewing Aircraft," filed concurrently herewith, the entire contents of which are incorporated by reference herein.

The airspeed sensors 130 and 135, the control circuit 140, the inertial sensor 145, and the first, second, third and fourth control actuators 150, 155, 152 and 157 can be located at any suitable location within or on the fuselage 105 of the aircraft 100. The first, second, third and fourth control actuators 150, 155, 152 and 157 can comprise any suitable type of electrical, electronic or mechanical device capable of actuating the respective control surfaces. The first and second airspeed sensors 170 and 175 can be any suitable type of electrical, electronic or mechanical device that is capable of measuring the airspeed or dynamic pressure of the aircraft 100. The inertial sensor 145 can be any suitable type of electrical, electronic or mechanical device that is capable of providing suitable inertial guidance signals.

The control circuit 140 can be any suitable type of electrical or electronic device capable of performing the functions for the control circuit 140 discussed herein. For example, the control circuit 140 can be comprised of hardware, software, firmware or any suitable combination thereof. The control circuit 140 can be in electrical communication with the first and second airspeed sensors 130 and 135, the inertial sensor 145, and the first, second, third and fourth control actuators 150, 155, 152 and 157 using any suitable type of electrical connection that is capable of communicating electrical signals.

Alternatively, the control circuit 140 can be comprised of any suitable type of processor, including any type of microprocessor, microcontroller, digital signal processor (DSP), application-specific integrated circuit (ASIC), programmable read-only memory (PROM), erasable programmable read-only memory (EPROM), electrically-erasable programmable read-only memory (EEPROM), or the like. The control circuit 140 can be connected to or include a memory, such as, for example, any type of computer memory or any other type of electronic storage medium, such as, for example, read-only memory (ROM), random access memory (RAM), cache memory, compact disc read-only memory (CDROM), electro-optical memory, magneto-optical memory, or the like. The processor and memory can be used, for example, to perform some or all of the functions of the control circuit 140 described herein. As will be appreciated based on the foregoing description, the memory can be programmed using conventional techniques known to those having ordinary skill in the art of computer programming. For example, the actual source code or object code of the computer program can be stored in the memory.

Figure 2:
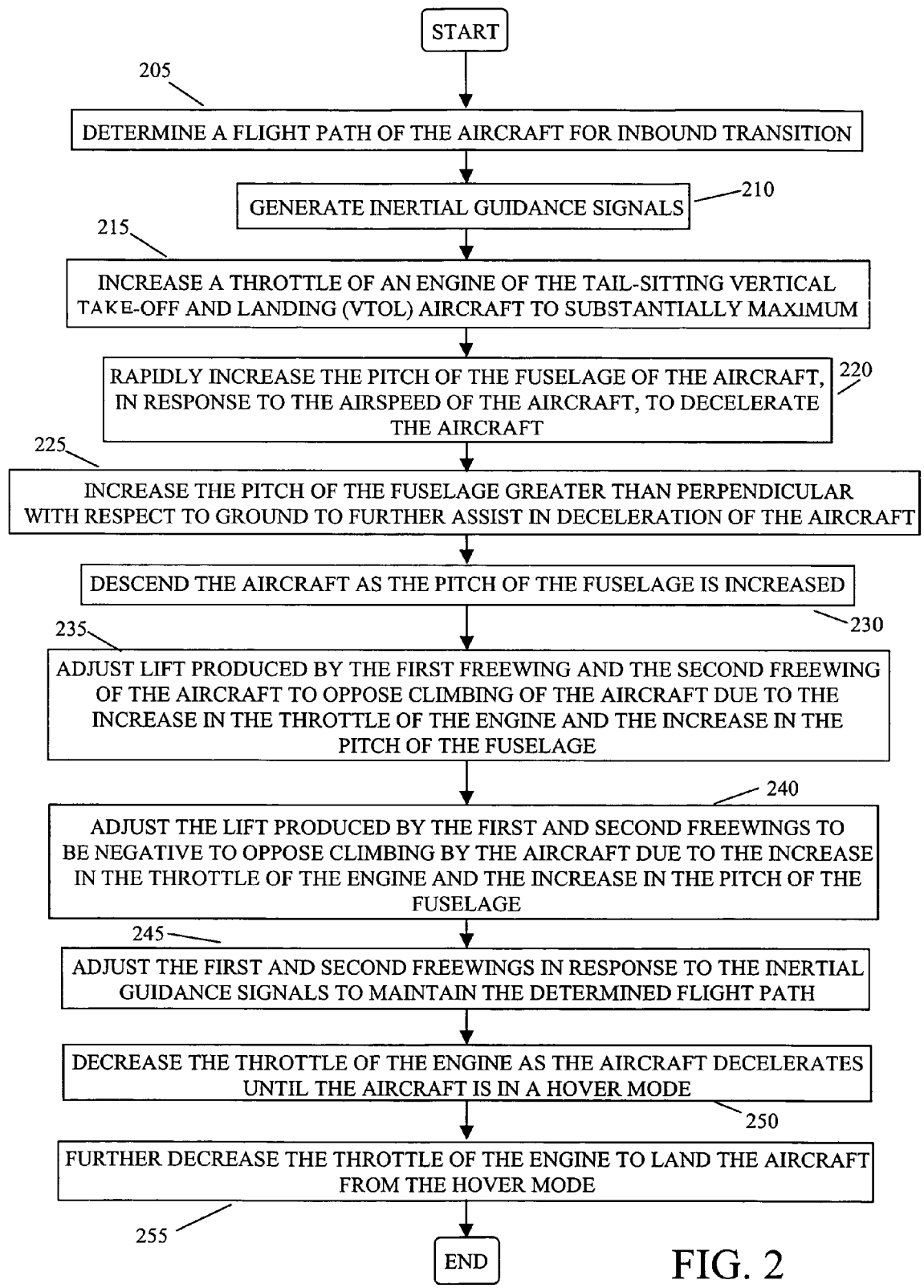
FIG. 2 is a flowchart illustrating steps for controlling inbound transition of a tail-sitting VTOL aircraft, in accordance with an exemplary embodiment of the present invention.

FIG. 2 is a flowchart illustrating steps for controlling inbound transition of a tail-sitting VTOL aircraft, in accordance with an exemplary embodiment of the present invention. In step 205, the flight path of a tail-sitting VTOL aircraft is determined for inbound transition. The tail-sitting VTOL aircraft includes a first freewing and a second freewing pivotably mounted on opposing sides of the fuselage of the aircraft. In step 210, inertial guidance signals are generated based on the determined flight path. In step 215, the throttle of the engine of the aircraft is increased to substantially maximum for inbound transition. In step 220, the pitch of the fuselage of the aircraft is rapidly increased, in response to the measured airspeed of the aircraft, to decelerate the aircraft. In step 225, the pitch of the fuselage is increased to be greater than perpendicular with respect to the ground to further assist in deceleration of the aircraft. In step 230, the aircraft can be descended as the pitch of the fuselage is increased.

In step 235, the lift produced by the first and second freewings is adjusted to oppose climbing of the aircraft due to the increase in the throttle of the engine and the increase in the pitch of the fuselage. For example, in step 240, the lift produced by the first and second freewings can be adjusted to be negative to oppose climbing by the aircraft due to the increase in the throttle of the engine and the increase in the pitch of the fuselage. In step 245, the first and second freewings can be adjusted in response to the inertial guidance signals to maintain the determined flight path. In step 250, the throttle of the engine is decreased as the aircraft decelerates until the aircraft is in a hover mode. According to an exemplary embodiment, the angle of attack of the first and second freewings can be altered to produce substantially zero lift in hover mode, for example, in the presence of steady winds. According to an alternative exemplary embodiment, the angle of attack of the first and second freewings can be altered to produce a positive lift to increase performance of the aircraft, for example, while in hover mode in the presence of strong winds. In step 255, the throttle of the engine can be further decreased to land the aircraft from the hover mode. Those of ordinary skill will recognize that a similar sequence of steps, applied in a substantially reverse order, can be used for lift-off, hover, and then flight of the aircraft for outbound transition. For example, in the case of outbound transition, the freewings can provide upward lift to allow more of the engine thrust to be used to accelerate the aircraft.

Figure 3:
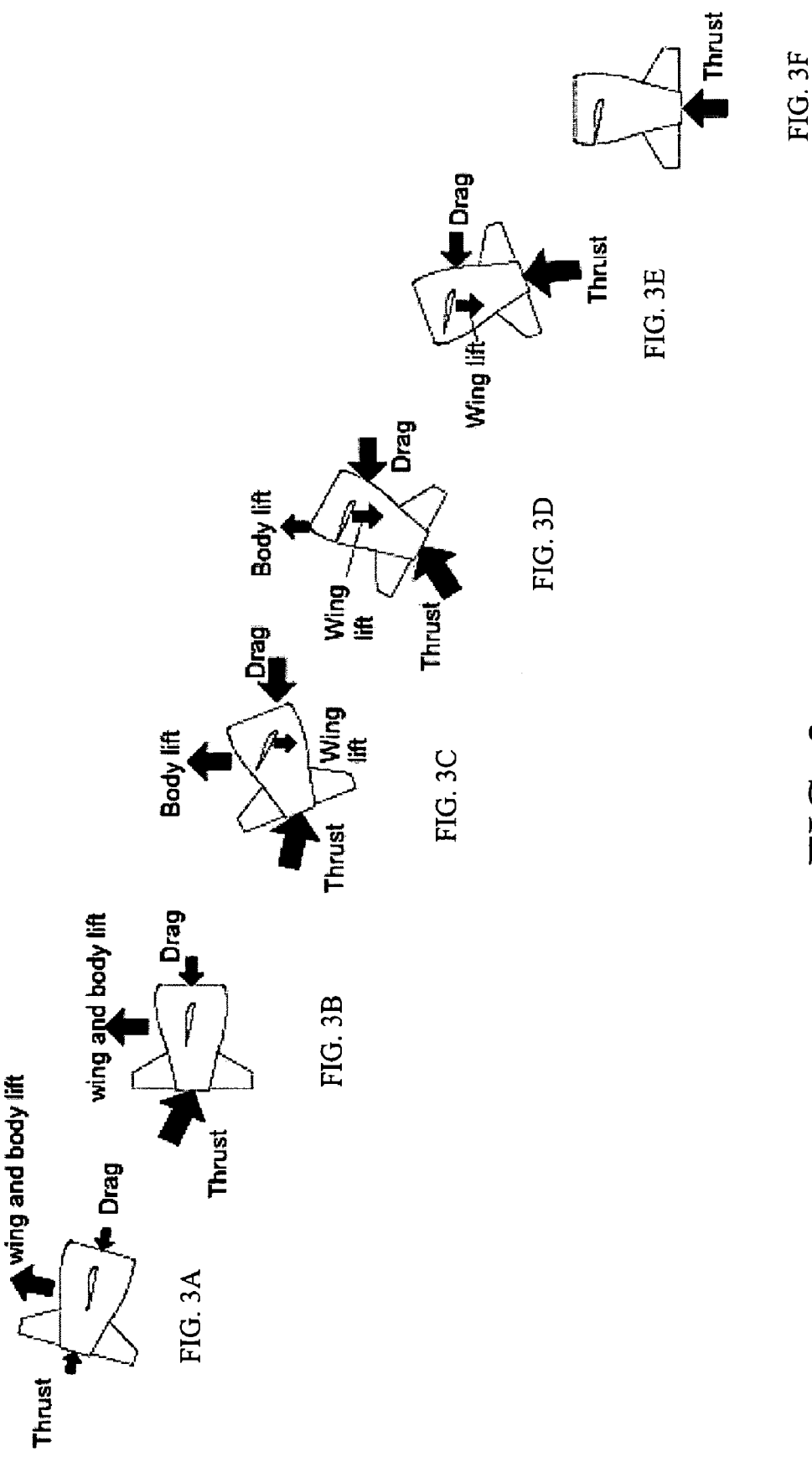
FIGS. 3A–3F are diagrams illustrating the inbound transition of a tail-sitting VTOL aircraft, in accordance with an exemplary embodiment of the present invention.

To further illustrate the steps for controlling inbound transition of a tail-sitting VTOL aircraft, FIGS. 3A–3F are diagrams illustrating the inbound transition of a tail-sitting VTOL aircraft, in accordance with an exemplary embodiment of the present invention. FIGS. 3A–3F illustrate the directions or vectors for the thrust, wing lift, body lift, and drag of the aircraft during each stage of the inbound transition. In FIG. 3A, the aircraft is in an initial low-power descent in flight to the predetermined initial point for the inbound transition maneuver. In FIG. 3B, the aircraft can go to high throttle to maximize available control moments. The fuselage of the aircraft begins to pitch up as the throttle is increased. In FIGS. 3C and 3D, the control circuit or other flight computer is configured to keep the fuselage at maximum controllable angle of attack as the aircraft decelerates. The freewings are adjusted as needed to maintain the desired flight path. The freewings can produce downward lift to offset the fuselage lift and the engine thrust. In FIG. 3E, the continued high power of the engine can allow pitching of the fuselage past a substantially vertical orientation. Such an orientation produces a high drag with some backwards thrust to assist in deceleration of the aircraft. The freewings can still maintain the desired flight path with downwards lift. The freewings can allow the aircraft to descend while the thrust is greater than the weight of the aircraft. In FIG. 3F, the aircraft is in a stable hover at a low altitude. According to an exemplary embodiment, for maximum stability in gusts, the freewings can be set or otherwise positioned to produce zero or substantially zero lift. Alternatively, as discussed previously, the angle of attack of the freewings can be altered to produce a positive lift to increase performance of the aircraft, for example, while in hover mode in the presence of strong winds.

Some or all of the steps of a computer program as illustrated in FIG. 2 for controlling inbound transition of a tail-sitting VTOL aircraft can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Exemplary embodiments of the present invention can be used in any suitable type of tail-sitting VTOL aircraft, such as, for example, a tail-sitting ducted fan VTOL aircraft or the like. For example, the inbound transition control system according to exemplary embodiments can be used in such aircraft to provide for a very rapid transition from forward flight to hover, and to provide additional stability with respect to gusts while hovering that would produce disturbances in conventional freewing aircraft, which can provide for additional stability for, for example, instruments or other sensor on the aircraft.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

What is claimed is:

1. A system for controlling inbound transition of a tail-sitting vertical takeoff and landing (VTOL) aircraft, comprising:
   a fuselage;
   a first freewing and a second freewing pivotably mounted on opposing sides of the fuselage;
   an airspeed sensor,
      wherein the airspeed sensor determines an airspeed of the aircraft and outputs an airspeed indication signal;
      a controller in communication with the airspeed sensor, wherein the controller receives the airspeed indication signal,
      wherein the controller increases thrust of an engine of the aircraft to substantially maximum during inbound transition, and
      wherein the controller generates a pitch control signal and a freewing control signal in response to the airspeed indication signal; and
   at least one actuator in communication with the controller,
      wherein the at least one actuator actuates control surfaces of the aircraft in response to the pitch control signal, rapidly increases a pitch of the fuselage and decelerates the aircraft,
      wherein the at least one actuator actuates control surfaces of the first and second freewings in response to the freewing control signal to adjust lift produced by the first and second freewings to oppose climbing of the aircraft due to the increase in the thrust of the engine and the increase in the pitch of the fuselage, and wherein the controller decreases the thrust of the engine as the aircraft decelerates until the aircraft is in a hover mode.

2. The system of claim 1, wherein the controller determines a flight path of the aircraft for inbound transition.

3. The system of claim 2, comprising:
an inertial sensor in communication with the controller,
wherein the inertial sensor generates inertial guidance signals, and
wherein the controller controls the at least one actuator to actuate the control surfaces of the first and second freewings in response to the inertial guidance signals to maintain the determined flight path.

4. The system of claim 1, wherein the controller decreases the thrust of the engine to land the aircraft from the hover mode.

5. The system of claim 1, wherein the controller controls the at least one actuator to actuate the control surfaces of the first and second freewings to adjust the lift produced by the first and second freewings to be negative to oppose climbing by the aircraft due to the increase in the thrust of the engine and the increase in the pitch of the fuselage.

6. The system of claim 1, wherein the controller controls the at least one actuator to actuate the control surfaces of the aircraft to increase the pitch of the fuselage greater than perpendicular with respect to ground to further assist in deceleration of the aircraft.

7. The system of claim 1, wherein the controller causes the aircraft to descend as the pitch of the fuselage is increased.

8. The system of claim 1, wherein the airspeed sensor comprises:
a pitot tube mounted on a boom on a fore portion of at least one of the first freewing and the second freewing.

9. The system of claim 8, wherein the pitot tube balances a weight of the at least one of the first freewing and the second freewing.

10. The system of claim 1, wherein the controller controls the at least one actuator to actuate the control surfaces of the first and second freewings to alter an angle of attack of the first and second freewings to produce substantially zero lift in the hover mode.

11. The system of claim 1, wherein the controller controls the at least one actuator to actuate the control surfaces of the first and second freewings to alter an angle of attack of the first and second freewings to produce a positive lift to increase performance of the aircraft.

12. The system of claim 1, wherein the aircraft comprises a ducted fan VTOL aircraft.

13. The system of claim 1, wherein the first and second freewings are each independently pivotably mounted on the opposing sides of the fuselage.

14. A system for controlling inbound transition of a tail-sitting vertical takeoff and landing (VTOL) aircraft, comprising:
a sensor circuit,
wherein the sensor circuit determines an airspeed of the aircraft and to output an airspeed indication signal, and
wherein the aircraft includes a first freewing and a second freewing pivotably mounted on opposing sides of a fuselage of the aircraft;
a control circuit in communication with the sensor circuit to receive the airspeed indication signal,
wherein the control circuit increases a throttle of an engine of the aircraft to substantially maximum for inbound transition, and
wherein the control circuit generates a pitch control signal and a freewing control signal in response to the airspeed indication signal; and
a control surface actuator in communication with the control circuit,
wherein the control surface actuator actuates control surfaces of the aircraft in response to the pitch control signal to rapidly increase a pitch of the fuselage to decelerate the aircraft,
wherein the control surface actuator actuates control surfaces of the first and second freewings in response to the freewing control signal to adjust lift produced by the first and second freewings to oppose climbing of the aircraft due to the increase in the throttle of the engine and the increase in the pitch of the fuselage, and
wherein the control circuit decreases the throttle of the engine as the aircraft decelerates until the aircraft is in a hover mode.

15. A method of controlling inbound transition of a tail-sitting vertical takeoff and landing (VTOL) aircraft, comprising:
a.) increasing a throttle of an engine of the aircraft to substantially maximum,
wherein the aircraft includes a first freewing and a second freewing pivotably mounted on opposing sides of a fuselage of the aircraft;
b.) rapidly increasing a pitch of the fuselage of the aircraft, in response to an airspeed of the aircraft, to decelerate the aircraft;
c.) adjusting lift produced by the first freewing and second freewing to oppose climbing of the aircraft due to the increase in the throttle of the engine and the increase in the pitch of the fuselage; and
d.) decreasing the throttle of the engine as the aircraft decelerates until the aircraft is in a hover mode.

16. The method of claim 15, comprising the step of:
e.) determining a flight path of the aircraft for inbound transition.

17. The method of claim 16, comprising the steps of:
f.) generating inertial guidance signals; and
g.) adjusting the first and second freewings in response to the inertial guidance signals to maintain the determined flight path.

18. The method of claim 15, wherein step (d) comprises the step of:
e.) further decreasing the throttle of the engine to land the aircraft from the hover mode.

19. The method of claim 15, wherein step (c) comprises the step of:
e.) adjusting the lift produced by the first and second freewings to be negative to oppose climbing by the aircraft due to the increase in the throttle of the engine and the increase in the pitch of the fuselage.

20. The method of claim 15, wherein step (b) comprises the step of:
e.) increasing the pitch of the fuselage greater than perpendicular with respect to ground to further assist in deceleration of the aircraft.

21. The method of claim 15, comprising the step of:
e.) descending the aircraft as the pitch of the fuselage is increased.

22. The method of claim 15, wherein a pitot tube is mounted on a boom on a fore portion of at least one of the first freewing and the second freewing for measuring the airspeed of the aircraft.

23. The method of claim 22, wherein the pitot tube is configured to balance a weight of the at least one of the first freewing and the second freewing.

24. The method of claim 15, comprising the step of:
 e.) altering an angle of attack of the first and second freewings to produce substantially zero lift in the hover mode.

25. The method of claim 15, comprising the step of:
 e.) altering an angle of attack of the first and second freewings to produce a positive lift to increase performance of the aircraft.

26. The method of claim 15, wherein the aircraft comprises a ducted fan VTOL aircraft.

27. The method of claim 15, wherein the first and second freewings are each independently pivotably mounted on the opposing sides of the fuselage.

* * * * *